Figure 1:
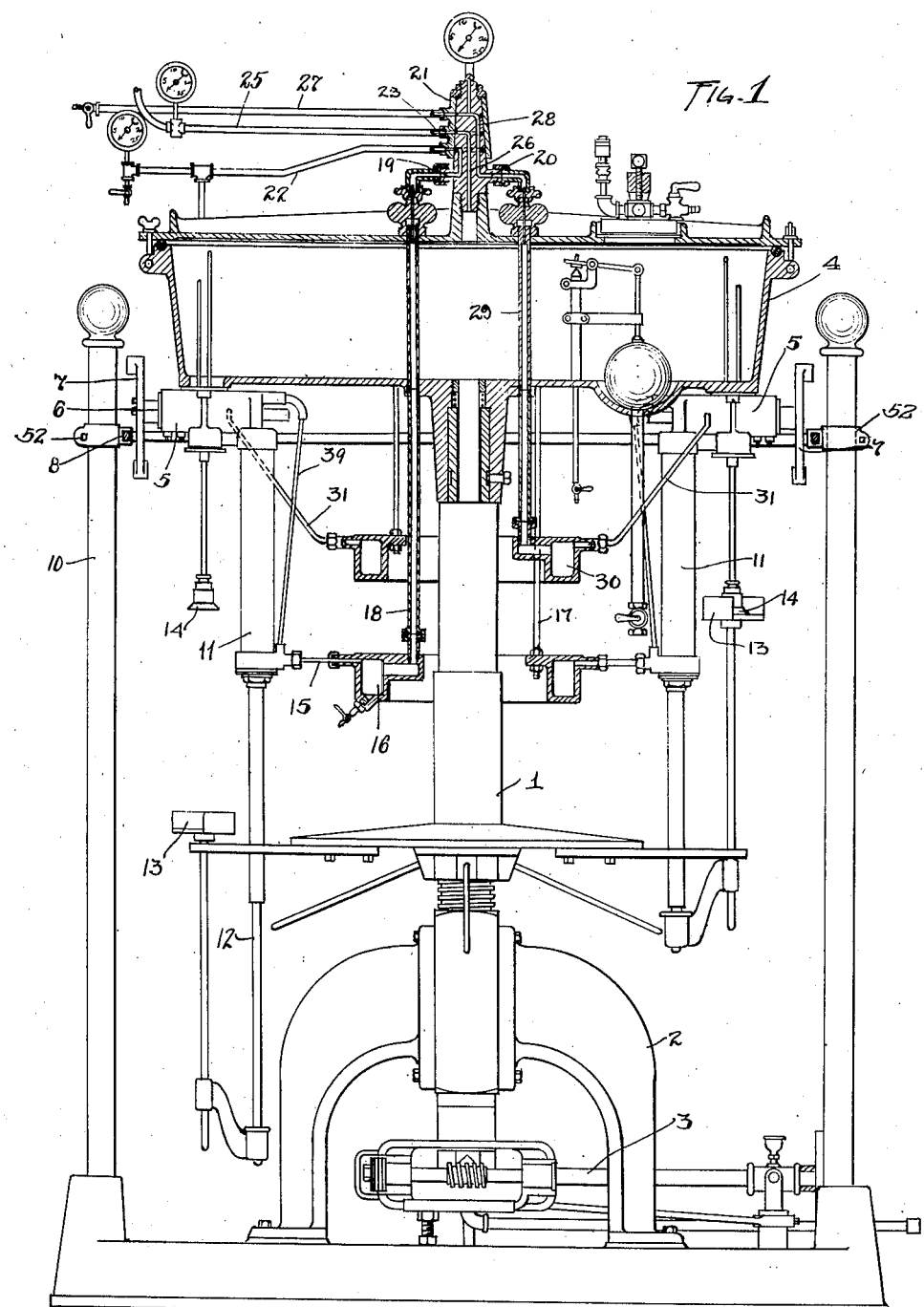

Jan. 18, 1927.

F. W. MÜLLER ET AL 1,614,485

BOTTLE FILLING MACHINE

Filed April 23, 1919 3 Sheets-Sheet 1

INVENTORS Fred W. Müller and
Edward H. Weatherhead
BY Fay, Oberlin & Fay ATTORNEYS Jan. 18, 1927.
F. W. MÜLLER ET AL
1,614,485
BOTTLE FILLING MACHINE
Filed April 23, 1919    3 Sheets-Sheet 2
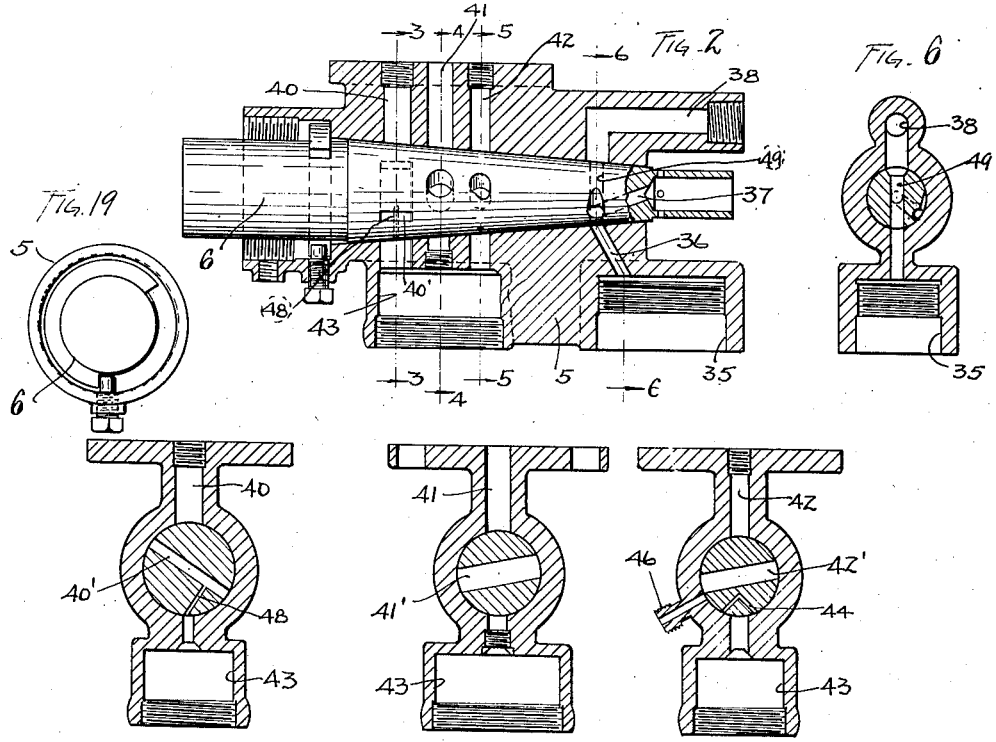
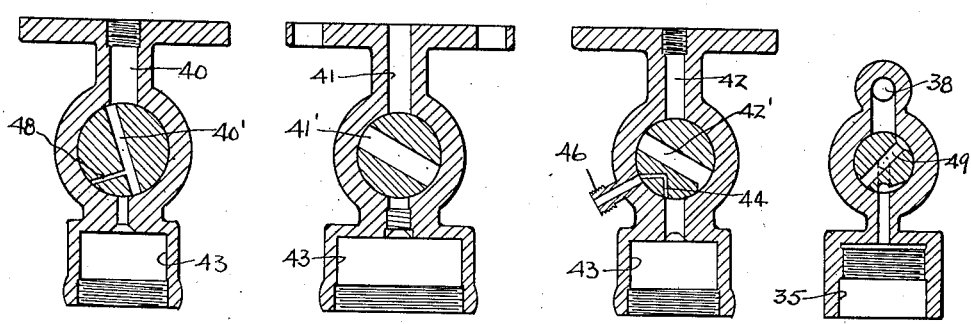
INVENTORS
Fred W. Müller and
Edward H. Weatherhead
By Stay, Oberlin & Stay
ATTORNEYS

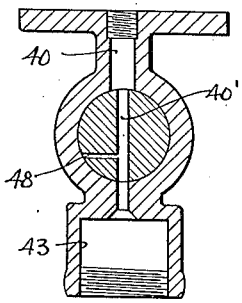 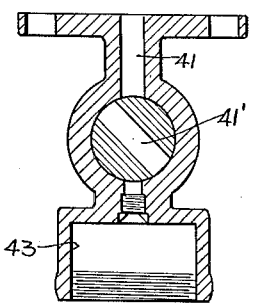 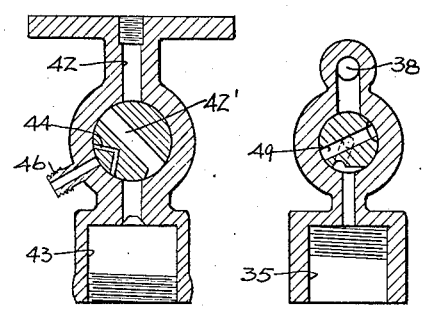
FIG. 11  FIG. 12  FIG. 13  FIG. 14
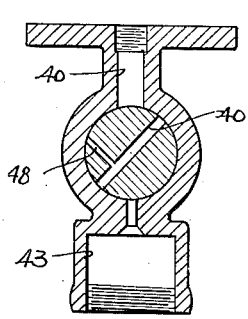 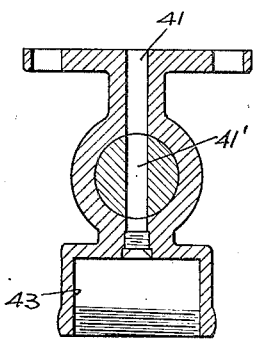 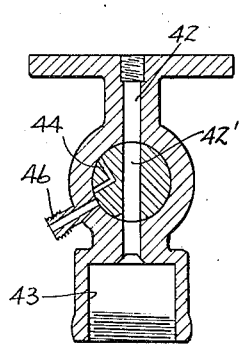 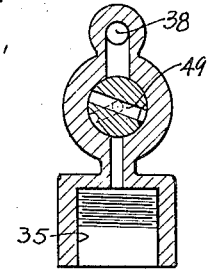
FIG. 15  FIG. 16  FIG. 17  FIG. 18
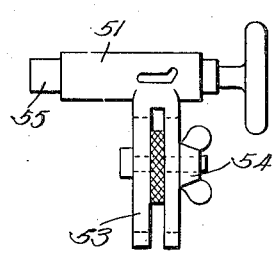
FIG. 20
INVENTORS
Fred W. Müller and
Edward H Weatherhead
By Day, Oberlin & Day
ATTORNEYS.

Patented Jan. 18, 1927.

1,614,485

UNITED STATES PATENT OFFICE.

FRED W. MÜLLER, OF HOBOKEN, NEW JERSEY, AND EDWARD H. WEATHERHEAD, OF CLEVELAND HEIGHTS, OHIO, ASSIGNORS TO THE BISHOP & BABCOCK COMPANY, OF CLEVELAND, OHIO, A CORPORATION OF OHIO.

BOTTLE-FILLING MACHINE.

Application filed April 23, 1919. Serial No. 292,130.

The present improvements, relating, as indicated, to filling machines, are particularly directed to the provision of mechanism to be used in bottle and can filling machines for removing the air from the bottle or other receptacle before the liquid is discharged into the same. In the filling of bottles with beer, near beer and many soft drinks, it has been found that the presence of even a small amount of air in contact with the liquid causes fermentation or other chemical action, which, in effect, produces a deterioration of the beverage, and it is to avoid this objection that the present invention has been devised. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is a side elevation, partially in section, showing a rotary filling machine, to which our invention is applied; Fig. 2 is a longitudinal vertical section through the filling valve and casing; Figs. 3, 4, 5 and 6 are transverse sections taken on the lines 3—3, 4—4, 5—5 and 6—6, respectively, in Fig. 2, and showing the valve in the first position to which it is moved; Figs. 7, 8, 9 and 10 are sections on the lines 3—3, 4—4, 5—5 and 6—6, in Fig. 2, respectively, but showing the valve in its second position; Figs. 11, 12, 13 and 14 are views corresponding to those of Figs. 7, 8, 9 and 10, respectively, but showing the valve in its third position; Figs. 15, 16, 17 and 18 are similar views showing the various parts of the valve in their last position; Fig. 19 is an end view of the valve and casing showing the means for determining the amount of movement of the valve, and Fig. 20 is an elevational view of one of the cams and stops.

The filling machine which is shown in Fig. 1 is of well known type, in which a vertical pedestal or spindle 1 is rotatably supported in a suitable frame or base 2 and rotated by means of suitable gearing, including the shaft 3. Mounted upon the upper end of the pedestal 1 is a liquid reservoir or tank 4, which rotates with the pedestal. Mounted beneath the tank 4 are a series of filling spouts or castings 5, on each of which is mounted a valve member 6 operated by means of a lever 7 the outer end of which is contacted by a series of cams or stops 51 mounted upon a supporting ring 8 carried by a series of brackets 52 mounted upon a plurality of supports 10 around the outside of the machine, only one stop is shown but of course any desired number of stops 51 may be used to variously operate the valve 6 upon the rotation of the machine. It is obvious that the proper number of stops 51 will be provided to actuate the member 17 at various positions as shown in the Champ Patent No. 956,286. Each stop 51 comprises a body member having a slotted shank 53 adapted to fit over the ring 8 and to be adjustable vertically as well as along the ring by means of a set screw 54. It will be observed from Fig. 1 that the ring 8 encircles the entire machine and these stops 51 may be adjusted in the desired radial position. The stop proper is a pin 55 passing through the body member and adjustable therethrough. These stops are set along the ring and adjusted so as to be placed in the path of lever 7, their vertical position determining the movement given to the lever by such stop and their circumferential position determining the time of valve actuation. The stop 51 described above is identical in function with that shown in the Champ Patent No. 956,286. Extending below each of the castings 5 is a cylinder 11 in which there is the usual pneumatically operated piston having a piston rod 12 extending below the cylinder and carrying a bottle-receiving stirrup 13 to bring the top of the bottle into contact with the filling spout proper 14, which extends downward from the casing 5. Air is supplied to the cylinders 11 by means of conduits 15 opening into a circular passage 16 which is supported by a rod 17 and has a conduit 18 passing through the tank 4 and connected with the passage 19 formed in a cylindrical member 20, which is rotatably mounted in the casing 21 mounted above the machine. Air is supplied from a suitable source through a conduit 22 to a groove 23 formed around the cylinder 20 and thus air is constantly supplied to the conduit 18 and circular passage 16.

The tank 4 contains liquid to be charged into the bottles and this liquid is usually maintained under a sufficient pressure to prevent the evolution of the charged gas. In order to prevent contamination of the liquid, the pressure maintained thereon is by means of the same gas with which the liquid is charged, usually carbonic acid gas, and a supply of such gas is furnished by means of a conduit 25 connected to a passage 26 in the cylinder 20 and leading directly downward therethrough into the space in the tank 4 above the liquid. A third conduit 27 is connected with a suitable suction apparatus (not shown), to maintain a high degree of vacuum in that passage, which communicates with a third pasage 28 in the cylinder 20. This passage 28 leads to a conduit 29, passing down through the tank 4, and connected with a second circular passage 30 similar to the passage 16. From this passage 30 a conduit 31 leads to the valve casing 5 for the purpose which will presently be described. It is scarcely necessary to describe further the action of the filling machine or the specific construction of the various parts, or of the tank, as the operation of the valve will be fully described hereafter and is completely shown in Figs. 2 to 18, inclusive.

Referring now to Fig. 2, there is shown the filling valve 6, which is a ground-in valve seated in a tapered passage in the casing 5. Formed as a part of the casing is the upper end 35 of the stirrup-lifting cylinder 11, from which air may be exhausted through a passage 36, connecting at different times with a discharge passage 37 and an air supply passage 38, the latter being connected by a conduit 39 with the air supply line 15. In Fig. 2 the valve is shown after having been turned to its first operative position which brings the discharge passage from the top of the cylinder 35 into registration with the exhaust pasage 37. The air pressure in the top of the cylinder 11 is then exhausted and the live air entering the cylinder beneath the piston from the passage 15 raises the piston, and with it the stirrup and bottle, until the latter has been brought into engagement with the filling spout 14. At this time the filling passages through the valve are not connected in any way with the bottle.

The valve casing 5 is provided with three vertically arranged parallel passages therethrough, of which the passage 40 is the counter pressure port admitting carbonic acid gas or other pressure fluid to the bottle, while the central passage 41 is the liquid filling passage, and the passage 42 is the counter pressure discharge passage, or, as it is commonly termed, the foam port. These three passages extend entirely through the casing 5 and connect to a single recess 43 which is in connection with the filling spout 14, and all of these passages are closed in the position of the valve which is shown in Figs. 2, 3, 4, 5 and 6.

The valve 6 is provided with ports extending therethrough for connecting the separated ports of the passages 40, 41 and 42 at the proper times, and these ports 40', 41' and 42' are shown in Figs. 3, 4 and 5. A small angular passage 44 is formed in the valve in the same plane as the foam port 42', and is shown in Fig. 5, and this passage may be termed the foam port in the valve for connecting the bottle with the vacuum conduit 31, which is shown entering the valve casing at the point 46.

After the bottle has been raised into filling position against the filling spout 14 the valve is turned by a second stop 51 until it is brought into the position shown by Figs. 7, 8, 9 and 10. During the remainder of the filling action the stirrup is of course held in such position as to press the bottle firmly against the filling spout 14, and the position of the bottle can be readily determined in the following figures by examining Figs. 10, 14 and 18. At the next stage of the filling action the counter pressure and filling ports are still disconnected, but the vacuum port 44 is now connected with the recess 43 and with the vacuum line 46, and during this position of the valve the air is drawn from the bottle until a very high degree of vacuum is secured therein.

The valve is then brought to the next position by the action of another stop 51 placed around the periphery of the filling machine and in this position of the valve the vacuum port is disconnected, as shown in Fig. 13, while the counter pressure port 40' connects the counter pressure passage 40 with the recess 43 and with the bottle. Carbonic acid gas is then admitted to the bottle in order to build up a pressure therein which will permit the charged water to flow into the bottle under the influence of its own weight only, as otherwise the counter pressure of the liquid on the tank would discharge the liquid into the bottle with so much force that a great amount of foam would be created and the filling action would be very poor.

The valve is then again turned upon further rotation of the filling machine into the position shown in Figs. 15, 16, 17 and 18, in which the counter pressure passage 40' is disconnected and the filling port 41' is brought into registration with the filling passage 41 and the foam port 42 registers with the foam passage 42'. During this position of the valve the bottle is filled with liquid through the ports 41 and 41', while the counter pressure in the bottle is allowed to escape back to the tank through the foam ports 42 and 42'.

The valve is then returned in the reverse direction to its original position at a single movement by means of another suitably positioned stop or cam 51 mounted on the ring 8. It will be obvious that as the valve is returned to its original position by being turned backwardly the vacuum port will again be connected momentarily with the top of the bottle, and it has been found that in some cases there is a sufficient suction action during this moment of registration to withdraw the gas from the neck of the bottle and cause the bottle to be held against the filling spout upon the lowering of the stirrup 13. To avoid this difficulty we have provided a small passage 48, which is shown in Figs. 3, 7, 11 and 15, as extending at an angle to the counter pressure port. The counter pressure port, through the valve when the valve is turned past the counter pressure filling position, is of course filled with a certain amount of counter pressure and the port is of sufficient size to act as a reservoir of fluid pressure. When the valve is returned to its original position at the stage when the vacuum port 44 has just been disconnected from the bottle, and the passage 46, which position is indicated in Fig. 5, the small passage 48 is brought into connection with the top of the bottle, as shown in Fig. 3. In this position the counter pressure, which has been held in the passage 40', is allowed to flow into the top of the bottle and compensate for the pressure which has been drawn out of the bottle through the vacuum passage 44. In this way any vacuum at the neck of the bottle is broken and the bottle is then free to descend when the stirrup 13 is lowered.

The stirrup 13 is caused to descend by the registration of the passage 49 at the small end of the valve 6 with the air supply passage 38 and the passage 36 leading to the top of the cylinder. As soon as pressure air is admitted to the top of the cylinder it balances the pressure beneath the piston of the cylinder, and the piston therein is then allowed to gradually descend because of the weight of the piston, stirrup and bottle, and the entire action of the valve mechanism is then completed.

It has been found that in the bottling of many beverages, and particularly near beer and syrup beverages, that the presence of air in the bottle leads to fermentation and to rapid deterioration of the liquid as a beverage, and by the present means substantially all air is removed from the bottle before any counter pressure is allowed to enter the bottle. As this counter pressure is next admitted to a bottle where a vacuum exists it will rush in with a considerable force, and if there is any slight amount still left in the bottle it will be displaced by the counter pressure as soon as the filling port and foam port are in registration and the counter pressure is in turn allowed to return to the top of the tank. An absence of air is thus assured in the bottle, both during the filling of the bottle and thereafter, and the only gas which comes in contact with the liquid is the counter pressure gas, which is of course usually the same gas with which the liquid is charged.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a bottle filling machine, the combination of a rotatable pedestal, a liquid supply tank mounted on said pedestal, conduits for supplying a liquid and a pressure fluid to said tank, a vacuum conduit supported by said pedestal, a liquid filling conduit and a pressure fluid conduit leading from said tank, a bottle filling spout rotatable with said pedestal, a valve carried by the pedestal and having ports adapted successively to connect said vacuum conduit, said fluid pressure conduit and said filling conduit with said filling spout, means operated by the partial rotation of the pedestal to move the valve ports to such successive positions and on further rotation of the pedestal to reverse such successive movements of said valve ports.

2. In a bottle filling machine, the combination of a rotatable pedestal, a liquid supply tank mounted on said pedestal, conduits for supplying a liquid and a pressure fluid to said tank, a vacuum conduit supported by said pedestal, a liquid filling conduit and a pressure fluid conduit leading from said tank, a bottle filling spout rotatable with said pedestal, a valve carried by the pedestal and having ports adapted successively to connect said vacuum conduit, said fluid pressure conduit and said filling conduit with said filling spout, means operated by the partial rotation of the pedestal to move the valve ports to such successive positions and on further rotation of the pedestal to reverse such successive movements of said valve ports, said valve being further provided with a port adapted to break the vacuum produced by the reversal of the valve movement.

Signed by FRED W. MÜLLER, this 9th day of April, 1919.

FRED W. MÜLLER.

Signed by EDWARD H. WEATHERHEAD, this 7th day of April, 1919.

EDWARD H. WEATHERHEAD.